(12) United States Patent
Yamamoto et al.

(10) Patent No.: US 7,366,234 B2
(45) Date of Patent: Apr. 29, 2008

(54) ADAPTIVE EQUALIZATION APPARATUS AND ADAPTIVE EQUALIZATION METHOD

(75) Inventors: Akira Yamamoto, Takatsuki (JP); Harumitsu Miyashita, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 666 days.

(21) Appl. No.: 10/936,703

(22) Filed: Sep. 9, 2004

(65) Prior Publication Data

US 2005/0063275 A1 Mar. 24, 2005

(30) Foreign Application Priority Data

Sep. 9, 2003 (JP) .............................. 2003-316863

(51) Int. Cl.
*H03H 7/30* (2006.01)
(52) U.S. Cl. ..................................... 375/232
(58) Field of Classification Search ................ 375/229, 375/230, 232, 233
See application file for complete search history.

(56) References Cited

U.S. PATENT DOCUMENTS 5,287,385 A * 2/1994 Sugawara et al. .......... 375/341

FOREIGN PATENT DOCUMENTS

| JP | 5-128729 | 5/1993 |
|----|----------|--------|
| JP | 2003-51163 | 2/2003 |
| JP | 2003-85764 | 3/2003 |
| JP | 2003-141823 | 5/2003 |
| JP | 9-97476 | 4/2007 |

* cited by examiner

*Primary Examiner*—Kevin Kim
(74) *Attorney, Agent, or Firm*—Wenderoth, Lind & Ponack, L.L.P.

(57) ABSTRACT

An adaptive equalization apparatus comprises an equalizer for equalizing a playback signal read from a recording medium, using tap coefficients; a maximum likelihood decoder for subjecting an equalized signal outputted from the equalizer to maximum likelihood decoding; a first delay unit for delay-adjusting the playback signal to make the signal coincide with the timing of a tentative decoded signal that is obtained in the process of maximum likelihood decoding; a second delay unit for delay-adjusting the equalized signal to make the signal coincide with the timing of the tentative decoded signal; and a coefficient adaptive controller for adaptively controlling the tap coefficients so that an error in the maximum likelihood decoding is minimized, on the basis of the tentative decoded signal, an output of the first delay unit, and an output of the second delay unit.

42 Claims, 9 Drawing Sheets

→ path in the case where (0001111) is given
---▶ path in the case where (0000111) is given

ADAPTIVE EQUALIZATION APPARATUS AND ADAPTIVE EQUALIZATION METHOD

FIELD OF THE INVENTION

The present invention relates to an information playback apparatus that uses a PRML (Partial Response Maximum Likelihood) signal processing technique and, more particularly, to an adaptive equalization apparatus and an adaptive equalization method for adaptively equalizing a playback signal.

BACKGROUND OF THE INVENTION

In devices for reproducing information recorded on recording media such as a HDD, a DVD, and a Blu-ray Disc, PRML signal processing techniques have been employed to improve playback performance. As for PR equalization, adaptive equalization methods have been employed to respond to variations in characteristics of recording media and playback paths.

Currently, there is generally employed an adaptive equalization method that minimizes an equalization error by a LMS (Least Mean Square) algorithm, while another algorithm that minimizes an error in maximum likelihood decoding is also proposed for further improvement in playback performance. For example, there is proposed an adaptive equalization method which updates coefficients so as to minimize an error in maximum likelihood decoding, which error is obtained from SAM (Sequenced Amplitude Margin) (refer to "Tetsuya Okumura et al., New Adaptive Equalization Method for PRML System using Sequenced Amplitude Margin, Technical Digest of Optical Data Storage 2003, May 11th, 2003, pp.96-98"). Hereinafter, a description will be given of coefficient update formulas obtained when the aforementioned method is applied to (1,7)RLL (Run-length Limited coding), PR(1,2,2,1)ML, with reference to FIGS. 7 and 8. FIG. 7 shows an equalization waveform of ideal PR(1,2,2,1). The ideal PR(1,2,2,1) equalization waveform in (1,7)RLL has seven amplitude values, which are represented as $T_0$, $T_1$, $T_2$, $T_3$, $T_4$, $T_5$, $T_6$, respectively. FIG. 8 is a trellis diagram. The state of the trellis diagram is determined by 3 bits, and it is denoted as $S_{000}$ when the bit sequence is (000).

The ideal waveform for a given bit sequence (0001111) is ($T_1$, $T_3$, $T_5$, $T_6$) that is shown in FIG. 7 by the solid line, and the state of its trellis diagram changes from $S_{000}$ to $S_{111}$ as shown in FIG. 8 by the solid line. Likewise, the ideal waveform for a given bit sequence (0000111) is ($T_0$, $T_1$, $T_3$, $T_5$) that is shown in FIG. 7 by the dotted line, and the state of its trellis diagram changes from $S_{111}$ to $S_{000}$ as shown in FIG. 8 by the dotted line.

To be specific, there exist two paths in the same state transition, and the square of Euclidean distance $d^2$ between these two paths can be calculated as follows.

$$d^2 = (T_1 - T_0)^2 + (T_3 - T_1)^2 + (T_5 - T_3)^2 + (T_6 - T_5)^2 \quad (1)$$

The following table 1 provides a summary of the square of Euclidean distance $d^2$ between two paths having the same state transition, in bit sequences each having a length of 7 bits.

TABLE 1

State Transition and Square of Euclidean Distance in (1, 7)RLL + PR(1, 2, 2, 1)

| State Transition | Sequence 1 | Sequence 2 | $d^2$ |
|---|---|---|---|
| $S_{000} \to S_{111}$ | 0001111 | 0000111 | $(T_1 - T_0)^2 + (T_3 - T_1)^2 + (T_5 - T_3)^2 + (T_6 - T_5)^2$ |
| $S_{000} \to S_{110}$ | 0001110 | 0000110 | $(T_1 - T_0)^2 + (T_3 - T_1)^2 + (T_5 - T_3)^2 + (T_5 - T_4)^2$ |
| $S_{100} \to S_{111}$ | 1001111 | 1000111 | $(T_2 - T_1)^2 + (T_3 - T_1)^2 + (T_5 - T_3)^2 + (T_6 - T_5)^2$ |
| $S_{100} \to S_{110}$ | 1001110 | 1000110 | $(T_2 - T_1)^2 + (T_3 - T_1)^2 + (T_5 - T_3)^2 + (T_5 - T_4)^2$ |
| $S_{011} \to S_{001}$ | 0111001 | 0110001 | $(T_5 - T_4)^2 + (T_5 - T_3)^2 + (T_3 - T_1)^2 + (T_2 - T_1)^2$ |
| $S_{011} \to S_{000}$ | 0111000 | 0110000 | $(T_5 - T_4)^2 + (T_5 - T_3)^2 + (T_3 - T_1)^2 + (T_1 - T_0)^2$ |
| $S_{111} \to S_{001}$ | 1111001 | 1110001 | $(T_6 - T_5)^2 + (T_5 - T_3)^2 + (T_3 - T_1)^2 + (T_2 - T_1)^2$ |
| $S_{111} \to S_{000}$ | 1111000 | 1110000 | $(T_6 - T_5)^2 + (T_5 - T_3)^2 + (T_3 - T_1)^2 + (T_1 - T_0)^2$ |

If the seven values are all equally spaced, that is, if the seven values can be expressed by the following equation, $$(T_1-T_0)=(T_2-T_1)=(T_3-T_2)=(T_4-T_3)=(T_5-T_4)=(T_6-T_5) \quad (2)$$

the squares $d^2$ of the 8 state transitions would have the same value, $10(T_1-T_0)^2$.

It is now assumed that a waveform corresponding to a correct bit sequence (0001111) is input to an equalizer. The bit sequence corresponding to another path having the same state transition is (0000111), which is the most frequently mis-decoded bit sequence during maximum likelihood decoding, and therefore, it is called as an incorrect bit sequence.

Assuming that the input waveform is $\{u(-4,n), u(-3,n), u(-2,n), u(-1,n), u(0,n), u(1,n)\}$, the equalization waveform is $\{y(-3,n), y(-2,n), y(-1,n), y(0,n)\}$, and the tap coefficient is $c(k,n)$, the following equations will hold.

$$y(0, n) = \sum_{k=-1}^{1} c(k, n)u(k, n) \quad (3)$$

$$y(-1, n) = \sum_{k=-1}^{1} c(k, n)u(-1 + k, n)$$

$$y(-2, n) = \sum_{k=-1}^{1} c(k, n)u(-2 + k, n)$$

$$y(-3, n) = \sum_{k=-1}^{1} c(k, n)u(-3 + k, n)$$

The above equations represent a 3-tap FIR (Finite Impulse Response) type equalizer, which can be illustrated as FIG. 9. While in FIG. 9 the number of taps is three for convenience sake, an expansion of the number of taps can easily be achieved.

The ideal PR(1,2,2,1) equalization waveforms corresponding to the correct bit sequence (0001111) and the incorrect bit sequence (0000111) are ($T_1$, $T_3$, $T_5$, $T_6$), ($T_0$, $T_1$, $T_3$, $T_5$), respectively. Consequently, the metric difference $s(n)$ between the equalization waveform and each of the two paths can be calculated as follows:

$$s(n) = \{y(-3, n) - T_0\}^2 + \{y(-2, n) - T_1\}^2 + \{y(-1, n) - T_3\}^2 + \quad (4)$$
$$\{y(0, n) - T_5\}^2 - \{y(-3, n) - T_1\}^2 \{y(-2, n) - T_3\}^2 -$$
$$\{y(-1, n) - T_5\}^2 - \{y(0, n) - T_6\}^2$$
$$= 2\{T_1 - T_0\}y(-3, n) + 2\{T_3 - T_1\}y(-2, n) +$$
$$2\{T_5 - T_3\}y(-1, n) + 2\{T_6 - T_5\}y(0, n) + T_0^2 - T_6^2$$
$$= 2\sum_{k=-1}^{1} c(k, n)\{\{T_1 - T_0\}u(-3 + k, n) + \{T_3 - T_1\}u(-2 + k, n) +$$
$$\{T_5 - T_3\}u(-1 + k, n) + \{T_6 - T_5\}u(k, n)\} + T_0^2 - T_6^2$$

On the other hand, an error function ϵ is defined as follows:

$$\epsilon = E[\{s(n) - d^2\}^2] \quad (5)$$

where E represents the expected value operator. By substituting equations (4) into equation (5), and partial-differentiating ϵ with c(k,n), the following equation (6) can be obtained.

$$\frac{\partial \varepsilon}{\partial c(k, n)} = \quad (6)$$
$$2E[\{s(n) - d^2\} \cdot 2\{\{T_1 - T_0\}u(-3 + k, n) + \{T_3 - T_1\}u(-2 + k, n) +$$
$$\{T_5 - T_3\}u(-1 + k, n) + \{T_6 - T_5\}u(k, n)\}]$$

The above equation (6) represents a gradient vector of an error characteristics curved-plane. The element of the gradient vector is equal to the primary derivative of the mean square error ϵ regarding the tap coefficient c(k,n). When the tap coefficient is continuously corrected in the opposite direction of the gradient vector, that is, in the steepest descent direction of the error characteristics curved-plane, the minimum mean square error $\epsilon_{min}$ is reached eventually. This is a long-existing optimization method, called as the method of steepest descent.

In order to realize the above-described method as a practical device, the expected value operator E should be replaced by an instant estimation value. That is, the tap coefficient c(k,n) should be updated as below.

$$c(k,n+1) = c(k,n) - 2\mu\{s(n) - d^2\} \cdot 2\{\{T_1 - T_0\}u(-3+k,n) + \{T_3 - T_1\}u(-2+k,n) + \{T_5 - T_3\}u(-1+k,n) + \{T_6 - T_5\}u(k,n)\} \quad (7)$$

where μ is the step size parameter. The above algorithm is a new adaptive equalization method.

While the above formula (7) is obtained from the correct bit sequence (0001111), similar formulas can also be obtained from other bit sequences. Hereinafter, coefficient update formulas for 16 correct bit sequences shown in table 1 will be described.

1) In the case of a correct bit sequence (0001111) and an incorrect bit sequence (0000111), the square of Euclidean distance $d^2$ between two paths having the same state transition, the metric difference s(n) between the equalization waveform and each of the paths having the same state transition, and the gradient vector are expressed by the following equations (8), (9), and (10), respectively.

$$d^2_{07} = (T_1 - T_0)^2 + (T_3 - T_1)^2 + (T_5 - T_3)^2 + (T_6 - T_5)^2 \quad (8)$$

$$s_{07}(n) = \{y(-3, n) - T_0\}^2 + \{y(-2, n) - T_1\}^2 + \quad (9)$$
$$\{y(-1, n) - T_3\}^2 + \{y(0, n) - T_5\}^2 -$$
$$\{y(-3, n) - T_1\}^2 - \{y(-2, n) - T_3\}^2 -$$
$$\{y(-1, n) - T_5\}^2 - \{y(0, n) - T_6\}^2$$
$$= 2\{T_1 - T_0\}y(-3, n) + 2\{T_3 - T_1\}y(-2, n) +$$
$$2\{T_5 - T_3\}y(-1, n) + 2\{T_6 - T_5\}y(0, n) + T_0^2 - T_6^2$$

$$\frac{\partial s_{07}(n)}{\partial c(k, n)} = 2\{T_1 - T_0\}u(-3 + k, n) + 2\{T_3 - T_1\}u(-2 + k, n) + \quad (10)$$
$$2\{T_5 - T_3\}u(-1 + k, n) + 2\{T_6 - T_5\}u(k, n)$$

Consequently, the tap coefficient c(k,n) is updated as follows.

$$c(k, n + 1) = c(k, n) - 2\mu\{s_{07}(n) - d_{07}^2\}\frac{\partial s_{07}(n)}{\partial c(k, n)} \quad (11)$$

2) In the case of a correct bit sequence (0000111) and an incorrect bit sequence (0001111), the tap coefficient c(k,n) is updated as follows.

$$c(k, n + 1) = c(k, n) - 2\mu\{s_{07}(n) - d_{07}^2\}\frac{\partial s_{07}(n)}{\partial c(k, n)} \quad (12)$$

3) In the case of a correct bit sequence (0001110) and an incorrect bit sequence (0000110), the square of Euclidean distance $d^2$ between two paths having the same state transition, the metric difference s(n) between the equalization waveform and each of the paths having the same state transition, and the gradient vector are expressed by the following equations (13), (14), and (15), respectively.

$$d^2_{06} = (T_1 - T_0)^2 + (T_3 - T_1)^2 + (T_5 - T_3)^2 + (T_5 - T_4)^2 \quad (13)$$

$$s_{06}(n) = \{y(-3, n) - T_0\}^2 + \{y(-2, n) - T_1\}^2 + \quad (14)$$
$$\{y(-1, n) - T_3\}^2 + \{y(0, n) - T_4\}^2 -$$
$$\{y(-3, n) - T_1\}^2 - \{y(-2, n) - T_3\}^2 -$$
$$\{y(-1, n) - T_5\}^2 - \{y(0, n) - T_5\}^2 =$$
$$2\{T_1 - T_0\}y(-3, n) + 2\{T_3 - T_1\}y(-2, n) +$$
$$2\{T_5 - T_3\}y(-1, n) + 2\{T_5 - T_4\}y(0, n) + T_0^2 - T_4^2 - 2T_5^2$$

$$\frac{\partial s_{06}(n)}{\partial c(k, n)} = 2\{T_1 - T_0\}u(-3 + k, n) + 2\{T_3 - T_1\}u(-2 + k, n) + \quad (15)$$
$$2\{T_5 - T_3\}u(-1 + k, n) + 2\{T_5 - T_4\}u(k, n)$$

Consequently, the tap coefficient c(k,n) is updated as follows.

$$c(k, n + 1) = c(k, n) - 2\mu\{s_{06}(n) - d_{06}^2\}\frac{\partial s_{06}(n)}{\partial c(k, n)} \quad (16)$$

4) In the case of a correct bit sequence (0000110) and an incorrect bit sequence (0001110), the tap coefficient c(k,n) is updated as follows.

$$c(k, n+1) = c(k, n) - 2\mu\{s_{06}(n) - d_{06}^2\}\frac{\partial s_{06}(n)}{\partial c(k, n)} \quad (17)$$

5) In the case of a correct bit sequence (1001111) and an incorrect bit sequence (1000111), the square of Euclidean distance $d^2$ between two paths having a same state transition, the metric difference $s(n)$ between the equalization waveform and each of the paths having the same state transition, and the gradient vector are expressed by the following equations (18), (19), and (29), respectively.

$$d^2_{47}=(T_2-T_1)^2+(T_3-T_1)^2+(T_5-T_3)^2+(T_6-T_5)^2 \quad (18)$$

$$\begin{aligned} s_{47}(n) = &\{y(-3, n) - T_1\}^2 + \{y(-2, n) - T_1\}^2 + \\ &\{y(-1, n) - T_3\}^2 + \{y(0, n) - T_5\}^2 - \\ &\{y(-3, n) - T_2\}^2 - \{y(-2, n) - T_3\}^2 - \\ &\{y(-1, n) - T_5\}^2 - \{y(0, n) - T_6\}^2 = \\ &2\{T_2 - T_1\}y(-3, n) + 2\{T_3 - T_1\}y(-2, n) + \\ &2\{T_5 - T_3\}y(-1, n) + 2\{T_6 - T_5\}y(0, n) + 2T_1^2 - T_2^2 - T_6^2 \end{aligned} \quad (19)$$

$$\begin{aligned} \frac{\partial s_{47}(n)}{\partial c(k, n)} = &2\{T_2 - T_1\}u(-3+k, n) + 2\{T_3 - T_1\}u(-2+k, n) + \\ &2\{T_5 - T_3\}u(-1+k, n) + 2\{T_6 - T_5\}u(k, n) \end{aligned} \quad (20)$$

Consequently, the tap coefficient $c(k,n)$ is updated as the following.

$$c(k, n+1) = c(k, n) - 2\mu\{s_{47}(n) - d_{47}^2\}\frac{\partial s_{47}(n)}{\partial c(k, n)} \quad (21)$$

6) In the case of a correct bit sequence (1000111) and an incorrect bit sequence (1001111), the tap coefficient $c(k,n)$ is updated as follows.

$$c(k, n+1) = c(k, n) + 2\mu\{-s_{47}(n) - d_{47}^2\}\frac{\partial s_{47}(n)}{\partial c(k, n)} \quad (22)$$

7) In the case of a correct bit sequence (1001110) and an incorrect bit sequence (1000110), the square of Euclidean distance $d^2$ between two paths having the same state transition, the metric difference $s(n)$ between the equalization waveform and each of the paths having the same state transition, and the gradient vector are expressed by the following equations (23), (24), and (25), respectively.

$$d^2_{46}=(T_2-T_1)^2+(T_3-T_1)^2+(T_5-T_3)^2+(T_5-T_4)^2 \quad (23)$$

$$\begin{aligned} s_{46}(n) = &\{y(-3, n) - T_1\}^2 + \{y(-2, n) - T_1\}^2 + \\ &\{y(-1, n) - T_3\}^2 + \{y(0, n) - T_4\}^2 - \\ &\{y(-3, n) - T_2\}^2 - \{y(-2, n) - T_3\}^2 - \\ &\{y(-1, n) - T_5\}^2 - \{y(0, n) - T_5\}^2 = \\ &2\{T_2 - T_1\}y(-3, n) + 2\{T_3 - T_1\}y(-2, n) + \\ &2\{T_5 - T_3\}y(-1, n) + 2\{T_5 - T_4\}y(0, n) + 2T_1^2 + T_4^2 - T_2^2 - 2T_5^2 \end{aligned} \quad (24)$$

$$\begin{aligned} \frac{\partial s_{46}(n)}{\partial c(k, n)} = &2\{T_2 - T_1\}u(-3+k, n) + 2\{T_3 - T_1\}u(-2+k, n) + \\ &2\{T_5 - T_3\}u(-1+k, n) + 2\{T_5 - T_4\}u(k, n)] \end{aligned} \quad (25)$$

Consequently, the tap coefficient $c(k,n)$ is updated as follows.

$$c(k, n+1) = c(k, n) - 2\mu\{s_{46}(n) - d_{46}^2\}\frac{\partial s_{46}(n)}{\partial c(k, n)} \quad (26)$$

8) In the case of a correct bit sequence (1000110) and an incorrect bit sequence (1001110), the tap coefficient $c(k,n)$ is updated as follows.

$$c(k, n+1) = c(k, n) + 2\mu\{-s_{46}(n) - d_{46}^2\}\frac{\partial s_{46}(n)}{\partial c(k, n)} \quad (27)$$

9) In the case of a correct bit sequence (0111001) and an incorrect bit sequence (0110001), the square of Euclidean distance $d^2$ between two paths having the same state transition, the metric difference $s(n)$ between the equalization waveform and each of the paths having the same state transition, and the gradient vector are expressed by the following equations (28), (29), and (30), respectively.

$$d^2_{31}=(T_5-T_4)^2+(T_5-T_3)^2+(T_3-T_1)^2+(T_2-T_1)^2=d^2_{46} \quad (28)$$

$$\begin{aligned} s_{31}(n) = &\{y(-3, n) - T_4\}^2 + \{y(-2, n) - T_3\}^2 + \\ &\{y(-1, n) - T_1\}^2 + \{y(0, n) - T_1\}^2 - \\ &\{y(-3, n) - T_5\}^2 - \{y(-2, n) - T_5\}^2 - \\ &\{y(-1, n) - T_3\}^2 - \{y(0, n) - T_2\}^2 = \\ &2\{T_5 - T_4\}y(-3, n) + 2\{T_5 - T_3\}y(-2, n) + \\ &2\{T_3 - T_1\}y(-1, n) + 2\{T_2 - T_1\}y(0, n) + T_4^2 + 2T_1^2 - 2T_5^2 - T_2^2 \end{aligned} \quad (29)$$

$$\begin{aligned} \frac{\partial s_{31}(n)}{\partial c(k, n)} = &2\{T_5 - T_4\}u(-3+k, n) + 2\{T_5 - T_3\}u(-2+k, n) + \\ &2\{T_3 - T_1\}u(-1+k, n) + 2\{T_2 - T_1\}u(k, n)] \end{aligned} \quad (30)$$

Consequently, the tap coefficient $c(k,n)$ is updated as follows.

$$c(k, n+1) = c(k, n) - 2\mu\{s_{31}(n) - d_{31}^2\}\frac{\partial s_{31}(n)}{\partial c(k, n)} \quad (31)$$

10) In the case of a correct bit sequence (0110001) and an incorrect bit sequence (0111001), the tap coefficient $c(k,n)$ is updated as follows.

$$c(k, n+1) = c(k, n) + 2\mu\{-s_{31}(n) - d_{31}^2\}\frac{\partial s_{31}(n)}{\partial c(k, n)} \quad (32)$$

11) In the case of a correct bit sequence (0111000) and an incorrect bit sequence (0110000), the square of Euclidean distance $d^2$ between two paths having the same state transition, the metric difference $s(n)$ between the equalization waveform and each of the paths having the same state transition, and the gradient vector can be expressed by the following equations (33), (34), and (35), respectively.

$$d^2_{30} = (T_5-T_4)^2 + (T_5-T_3)^2 + (T_3-T_1)^2 + (T_1-T_0)^2 = d^2_{06} \quad (33)$$

$$\begin{aligned}s_{30}(n) &= \{y(-3,n)-T_4\}^2 + \{y(-2,n)-T_3\}^2 + \\ &\quad \{y(-1,n)-T_1\}^2 + \{y(0,n)-T_0\}^2 - \\ &\quad \{y(-3,n)-T_5\}^2 - \{y(-2,n)-T_3\}^2 - \\ &\quad \{y(-1,n)-T_3\}^2 - \{y(0,n)-T_1\}^2 = \\ &\quad 2\{T_5-T_4\}y(-3,n) + 2\{T_5-T_3\}y(-2,n) + \\ &\quad 2\{T_3-T_1\}y(-1,n) + 2\{T_1-T_0\}y(0,n) + T_4^2 + T_0^2 - 2T_5^2\end{aligned} \quad (34)$$

$$\frac{\partial s_{30}(n)}{\partial c(k,n)} = 2\{T_5-T_4\}u(-3+k,n) + 2\{T_5-T_3\}u(-2+k,n) + \\ 2\{T_3-T_1\}u(-1+k,n) + 2\{T_1-T_0\}u(k,n)] \quad (35)$$

Consequently, the tap coefficient c(k,n) is updated as follows.

$$c(k,n+1) = c(k,n) - 2\mu\{s_{30}(n) - d^2_{30}\}\frac{\partial s_{30}(n)}{\partial c(k,n)} \quad (36)$$

12) In the case of a correct bit sequence (0110000) and an incorrect bit sequence (0111000), the tap coefficient c(k,n) is updated as follows.

$$c(k,n+1) = c(k,n) + 2\mu\{-s_{30}(n) - d^2_{30}\}\frac{\partial s_{30}(n)}{\partial c(k,n)} \quad (37)$$

13) In the case of a correct bit sequence (1111001) and an incorrect bit sequence (1110001), the square of Euclidean distance $d^2$ between two paths having the same state transition, the metric difference s(n) between the equalization waveform and each of the paths having the same state transition, and the gradient vector are expressed by the following equations (38), (39), and (40), respectively.

$$d^2_{71} = (T_6-T_5)^2 + (T_5-T_3)^2 + (T_3-T_1)^2 + (T_2-T_1)^2 = d^2_{47} \quad (38)$$

$$\begin{aligned}s_{71}(n) &= \{y(-3,n)-T_5\}^2 + \{y(-2,n)-T_3\}^2 + \\ &\quad \{y(-1,n)-T_1\}^2 + \{y(0,n)-T_1\}^2 - \\ &\quad \{y(-3,n)-T_6\}^2 - \{y(-2,n)-T_5\}^2 - \\ &\quad \{y(-1,n)-T_3\}^2 - \{y(0,n)-T_2\}^2 \\ &= 2\{T_6-T_5\}y(-3,n) + 2\{T_5-T_3\}y(-2,n) + \\ &\quad 2\{T_3-T_1\}y(-1,n) + 2\{T_1-T_0\}y(0,n) + \\ &\quad 2T_1^2 - T_6^2 - T_2^2\end{aligned} \quad (39)$$

$$\frac{\partial s_{71}(n)}{\partial c(k,n)} = 2\{T_6-T_5\}u(-3+k,n) + 2\{T_5-T_3\}u(-2+k,n) + \\ 2\{T_3-T_1\}u(-1+k,n) + 2\{T_2-T_1\}u(k,n)] \quad (40)$$

Consequently, the tap coefficient c(k,n) is updated as follows.

$$c(k,n+1) = c(k,n) - 2\mu\{s_{71}(n) - d^2_{71}\}\frac{\partial s_{71}(n)}{\partial c(k,n)} \quad (41)$$

14) In the case of a correct bit sequence (1110001) and an incorrect bit sequence (1111001), the tap coefficient c(k,n) is updated as follows.

$$c(k,n+1) = c(k,n) + 2\mu\{-s_{71}(n) - d^2_{71}\}\frac{\partial s_{71}(n)}{\partial c(k,n)} \quad (42)$$

15) In the case of a correct bit sequence (1111000) and an incorrect bit sequence (1110000), the square of Euclidean distance $d^2$ between two paths having the same state transition, the metric difference s(n) between the equalization waveform and each of the paths having the same state transition, and the gradient vector are expressed by the following equations (43), (44), and (45), respectively.

$$d^2_{70} = (T_6-T_5)^2 + (T_5-T_3)^2 + (T_3-T_1)^2 + (T_1-T_0)^2 = d^2_{07} \quad (43)$$

$$\begin{aligned}s_{70}(n) &= \{y(-3,n)-T_5\}^2 + \{y(-2,n)-T_3\}^2 + \\ &\quad \{y(-1,n)-T_1\}^2 + \{y(0,n)-T_0\}^2 - \\ &\quad \{y(-3,n)-T_6\}^2 - \{y(-2,n)-T_5\}^2 - \\ &\quad \{y(-1,n)-T_3\}^2 - \{y(0,n)-T_1\}^2 \\ &= 2\{T_6-T_5\}y(-3,n) + 2\{T_5-T_3\}y(-2,n) + \\ &\quad 2\{T_3-T_1\}y(-1,n) + 2\{T_1-T_0\}y(0,n) + T_0^2 - T_6^2\end{aligned} \quad (44)$$

$$\frac{\partial s_{70}(n)}{\partial c(k,n)} = 2\{T_6-T_5\}u(-3+k,n) + 2\{T_5-T_3\}u(-2+k,n) + \\ 2\{T_3-T_1\}u(-1+k,n) + 2\{T_1-T_0\}u(k,n)] \quad (45)$$

Consequently, the tap coefficient c(k,n) is updated as follows.

$$c(k,n+1) = c(k,n) - 2\mu\{s_{70}(n) - d^2_{70}\}\frac{\partial s_{70}(n)}{\partial c(k,n)} \quad (46)$$

16) In the case of a correct bit sequence (1110000) and an incorrect bit sequence (1111000), the tap coefficient c(k,n) is updated as follows.

$$c(k,n+1) = c(k,n) + 2\mu\{-s_{70}(n) - d^2_{70}\}\frac{\partial s_{70}(n)}{\partial c(k,n)} \quad (47)$$

Furthermore, the above-described tap coefficient will be updated only when a bit sequence (x00x11x) or (x11x00x) is detected.

FIG. 10 is a block diagram illustrating the construction of a conventional adaptive equalization apparatus. The conventional adaptive equalization apparatus performs adaptive equalization by using the coefficient update formulas described in 1) to 16) above.

An optical head 2 reads bit sequences which are recorded on an optical disk 1.

An analog-to-digital converter (A/D converter) 3 converts an analog playback signal, which is a recorded bit sequence read by the optical head 2, into a digital signal.

An equalizer 4 equalizes the output signal of the A/D converter 3.

A Viterbi decoder 5 subjects the equalized signal which is outputted from the equalizer 4 to maximum likelihood decoding.

A delay unit 6 carries out delay adjustment for the equalized signal which is outputted from the equalizer 4.

A delay unit 7 carries out delay adjustment for the digital playback signal which is an input to the equalizer 4.

A coefficient adaptive controller 8 adaptively controls tap coefficients which are used in the equalizer 4, on the basis of a maximum likelihood decoded bit sequence, i.e., the output signal of the Viterbi decoder 5, the output signal of the delay unit 6, and the output signal of the delay unit 7.

Hereinafter, a description will be given of the operation of the conventional adaptive equalization apparatus.

The bit sequence recorded on the optical disk 1 is read by the optical head 2 as an analog playback signal. The read analog playback signal is converted into a digital playback signal by the A/D converter 3, and equalized into PR(1,2, 2,1) by the equalizer 4. The equalized digital signal is subjected to maximum likelihood decoding by the Viterbi decoder 5, thereby generating a maximum likelihood decoded bit sequence.

In order to adjust the timing with the maximum likelihood decoded bit sequence obtained by the Viterbi decoder 5, the output of the equalizer 4 is delay-adjusted by the delay unit 6, and the input to the equalizer 4 is delay-adjusted by the delay unit 7. In the coefficient adaptive controller 8, the tap coefficient is adaptively updated on the basis of the decoded bit sequence, the delay-adjusted output of the equalizer 4, and the delay-adjusted input to the equalizer 4. The updated tap coefficient is then output to the equalizer 4. In this way, the equalizer 4 adaptively equalizes the digital playback signal.

Hereinafter, an explanation will be given of the coefficient adaptive controller 8 with reference to FIG. 11. FIG. 11 is a block diagram illustrating the construction of the coefficient adaptive controller 8.

In FIG. 11, a bit sequence detection circuit 81 detects a specific bit sequence from the decoded bit sequence. A maximum likelihood decoding error calculation circuit 82 calculates 16 types of maximum likelihood decoding errors from the delay-adjusted output of the equalizer 4, and selects one out of the 16 errors by a bit sequence detection signal. A gradient vector calculation circuit 83 calculates gradient vectors of 16 types of error characteristics curved-planes from the delay-adjusted input to the equalizer 4, and selects one out of the gradient vectors by the bit sequence detection signal. An update control circuit 84 outputs a coefficient update signal on the basis of the above bit sequence detection signal. A coefficient update circuit 85 carries out updating of the tap coefficient on the basis of the coefficient update signal.

Next, a description will be given of the coefficient adaptive control method.

The bit sequence detection circuit 81 detects specific bit sequences (x00x11x) and (x11x00x) from the decoded bit sequences. Since, in the above example, there exist 16 types of specific bit sequence, the bit sequence detection circuit 81 may be constructed so as to output a corresponding number of 1 to 16 when a specific bit sequence is detected, and output a number of 0 when there is no specific bit sequence detected.

The maximum likelihood decoding error calculation circuit 82 calculates 16 types of maximum likelihood decoding errors from the delay-adjusted output of the equalizer 4, selects one out of the 16 errors on the basis of the bit sequence detection signal, and outputs the selected error to the gradient vector calculation circuit 83. The gradient vector calculation circuit 83 calculates gradient vectors of 16 types of error characteristics curved-planes on the basis of the maximum likelihood decoding error and the delay-adjusted input to the equalizer 4, selects one out of the gradient vectors according to the bit sequence detection signal, and then outputs the selected gradient vector to the coefficient update circuit 85.

The update control circuit 84 outputs a coefficient update signal according to the value of the bit sequence detection signal to the coefficient update circuit 85. The coefficient update circuit 85 adds a value, which is obtained by multiplying the gradient vector by a coefficient $\mu$, to the tap coefficient, and outputs it as new tap coefficient. When the coefficient update signal is at LOW, the tap coefficient is not updated.

The conventional adaptive equalization apparatus shown in FIG. 10 performs coefficient adaptive control by using the maximum likelihood decoded bit sequence, which is obtained from the Viterbi decoder 5. The input and output of the equalizer 4 are delayed by the delay units 6 and 7 to make them coincide with the timing of the decoded bit sequence.

When only one survival path is left in the trellis diagram, the Viterbi decoder 5 decodes bits corresponding to the survival path. Therefore, the Viterbi decoder 5 requires a path memory having a length expected from the last survival path, and a delay equivalent to the length. For example, if the path memory has 30 stages, at least a delay equivalent to 30 clock is required.

As described above, since the delay in the Viterbi decoder 5 is considerable, the delay in the loop for adaptively controlling the tap coefficient is increased. Therefore, it takes much time to obtain the optimal tap coefficient. Further, it is difficult to follow abrupt variations in the waveform read by an optical head. Furthermore, a delay unit having a number of stages is required, resulting in an increase in circuit scale.

SUMMARY OF THE INVENTION

The present invention is made to solve the above-described problems and has for its object to provide an adaptive equalization apparatus which can improve the coefficient convergence characteristics by minimizing the delay in the coefficient control loop.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, an adaptive equalization apparatus comprises: an equalizer for equalizing a playback signal read from a recording medium, using tap coefficients; a maximum likelihood decoder for subjecting an equalized signal outputted from the equalizer to maximum likelihood decoding; a first delay unit for delay-adjusting the playback signal to make the signal coincide with the timing of a tentative decoded signal that is obtained in the process of maximum likelihood decoding; a second delay unit for delay-adjusting the equalized signal to make the signal coincide with the timing of the tentative decoded signal; and a coefficient adaptive controller for adaptively controlling the tap coefficients so that an error in the maximum likelihood decoding is minimized, on the basis of the tentative decoded signal, an output of the first delay unit, and an output of the second delay unit.

According to a second aspect of the present invention, an adaptive equalization apparatus comprises: an equalizer for equalizing a playback signal read from a recording medium, using tap coefficients; a maximum likelihood decoder for subjecting an equalized signal outputted from the equalizer to maximum likelihood decoding; a binarization unit for binarizing the equalized signal; a first delay unit for delay-adjusting the playback signal to make the signal coincide with the timing of a binarized signal outputted from the binarization unit; a second delay unit for delay-adjusting the equalized signal to make the signal coincide with the timing of the binarized signal; and a coefficient adaptive controller for adaptively controlling the tap coefficients so that an error in the maximum likelihood decoding is minimized, on the basis of the binarized signal, an output of the first delay unit, and an output of the second delay unit.

According to a third aspect of the present invention, an adaptive equalization apparatus comprises: an equalizer for equalizing a playback signal read from a recording medium, using tap coefficients; a maximum likelihood decoder for subjecting an equalized signal outputted from the equalizer to maximum likelihood decoding; a binarization unit for binarizing the playback signal; a first delay unit for delay-adjusting the playback signal to make the signal coincide with the timing of a binarized signal outputted from the binarization unit; a second delay unit for delay-adjusting the equalized signal to make the signal coincide with the timing of the binarized signal; and a coefficient adaptive controller for adaptively controlling the tap coefficients so that an error in the maximum likelihood decoding is minimized, on the basis of the binarized signal, an output of the first delay unit, and an output of the second delay unit.

According to a fourth aspect of the present invention, an adaptive equalization apparatus comprises: an equalizer for equalizing a playback signal read from a recording medium, using tap coefficients; a maximum likelihood decoder for subjecting an equalized signal outputted from the equalizer to maximum likelihood decoding; a first binarization unit for binarizing the equalized signal; a second binarization unit for binarizing the playback signal; a selector for selecting one signal out of a maximum likelihood decoded signal that is a result of the maximum likelihood decoding, a tentative decoded signal obtained in the process of the maximum likelihood decoding, an output signal of the first binarization unit, and an output signal of the second binarization unit; a first delay unit for delay-adjusting the playback signal to make the signal coincide with the timing of an output signal of the selector; a second delay unit for delay-adjusting the equalized signal to make the signal coincide with the timing of the output signal of the selector; and a coefficient adaptive controller for adaptively controlling the tap coefficients so that an error in the maximum likelihood decoding is minimized, on the basis of the output signal of the selector, an output signal of the first delay unit, and an output signal of the second delay unit.

According to a fifth aspect of the present invention, an adaptive equalization method comprises: an equalization step of equalizing a playback signal read from a recording medium, using tap coefficients; a maximum likelihood decoding step of subjecting an equalized signal obtained in the equalization step to maximum likelihood decoding; a first delay step of delay-adjusting the playback signal to make the signal coincide with the timing of a tentative decoded signal that is obtained in the process of maximum likelihood decoding; a second delay step of delay-adjusting the equalized signal to make the signal coincide with the timing of the tentative decoded signal; and a coefficient adaptive control step of adaptively controlling the tap coefficients so that an error in the maximum likelihood decoding is minimized, on the basis of the tentative decoded signal, the delay-adjusted playback signal, and the delay-adjusted equalized signal.

According to a sixth aspect of the present invention, an adaptive equalization method comprises: an equalization step of equalizing a playback signal read from a recording medium, using tap coefficients; a maximum likelihood decoding step of subjecting an equalized signal obtained in the equalization step to maximum likelihood decoding; a binarization step of binarizing the equalized signal; a first delay step of delay-adjusting the playback signal to make the signal coincide with the timing of a binarized signal that is obtained in the binarization step; a second delay step of delay-adjusting the equalized signal to make the signal coincide with the timing of the binarized signal; and a coefficient adaptive control step of adaptively controlling the tap coefficients so that an error in the maximum likelihood decoding is minimized, on the basis of the binarized signal, the delay-adjusted playback signal, and the delay-adjusted equalized signal.

According to a seventh aspect of the present invention, an adaptive equalization method comprises: an equalization step of equalizing a playback signal read from a recording medium, using tap coefficients; a maximum likelihood decoding step of subjecting an equalized signal obtained in the equalization step to maximum likelihood decoding; a binarization step of binarizing the playback signal; a first delay step of delay-adjusting the playback signal to make the signal coincide with the timing of a binarized signal that is obtained in the binarization step; a second delay step of delay-adjusting the equalized signal to make the signal coincide with the timing of the binarized signal; and a coefficient adaptive control step of adaptively controlling the tap coefficients so that an error in the maximum likelihood decoding is minimized, on the basis of the binarized signal, the delay-adjusted playback signal, and the delay-adjusted equalized signal.

According to an eighth aspect of the present invention, an adaptive equalization method comprises: an equalization step of equalizing a playback signal read from a recording medium, using tap coefficients; a maximum likelihood decoding step of subjecting an equalized signal obtained in the equalization step to maximum likelihood decoding; a first binarization step of binarizing the equalized signal; a second binarization step of binarizing the playback signal; a selection step of selecting one signal out of a maximum likelihood decoded signal that is a result of the maximum likelihood decoding, a tentative decoded signal obtained in the process of the maximum likelihood decoding, the binarized equalized signal, and the binarized playback signal; a first delay step of delay-adjusting the playback signal to make the signal coincide with the timing of a selection signal that is obtained in the selection step; a second delay step of delay-adjusting the equalized signal to make the signal coincide with the timing of the selection signal; and a coefficient adaptive control step of adaptively controlling the tap coefficients so that an error in the maximum likelihood decoding is minimized, on the basis of the selection signal, the delay-adjusted playback signal, and the delay-adjusted equalized signal.

In the adaptive equalization apparatuses and methods according to the present invention, since the tap coefficients are adaptively controlled on the basis of a bit sequence which is obtained at an earlier point in time than a decoded bit sequence obtained by Viterbi decoding, a delay in a coefficient control loop can be minimized, resulting in improved convergence characteristics of tap coefficients. Further, the number of stages in the delay units for delay adjustment can be reduced, resulting in reduced circuit scale.

DETAILED DESCRIPTION OF THE PREFERRED EMBODIMENTS

Hereinafter, preferred embodiments of the present invention will be concretely described with referent to the drawings. It will nevertheless be understood that embodiments below are merely examples, and no limitation of the scope of the present invention is thereby intended.

Embodiment 1

Hereinafter, a description will be given of an adaptive equalization apparatus according to a first embodiment with reference to FIG. 1.

Figure 1:
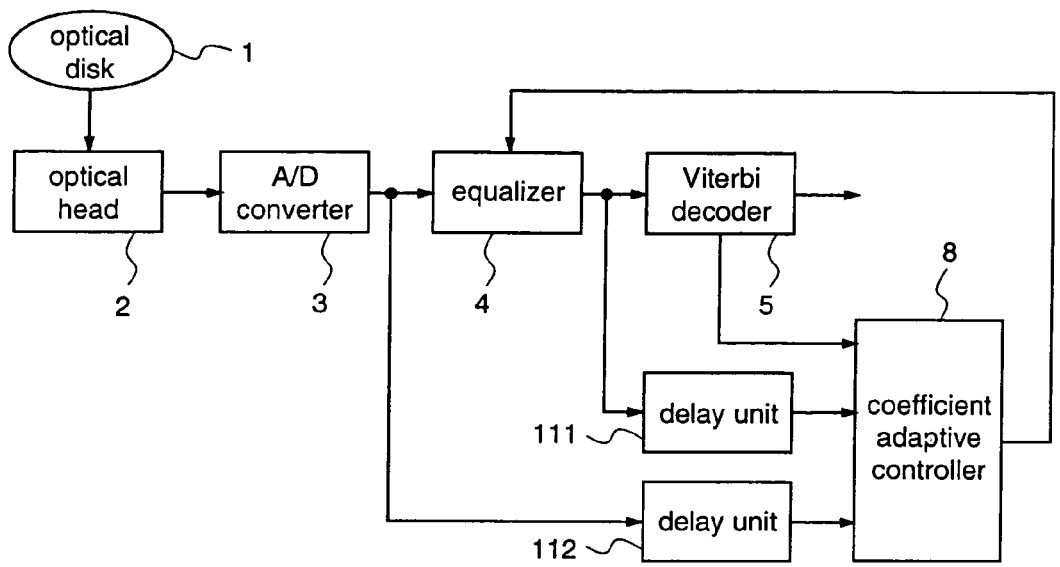
FIG. 1 is a block diagram illustrating the construction of an adaptive equalization apparatus according to a first embodiment of the present invention.
Figure 10:
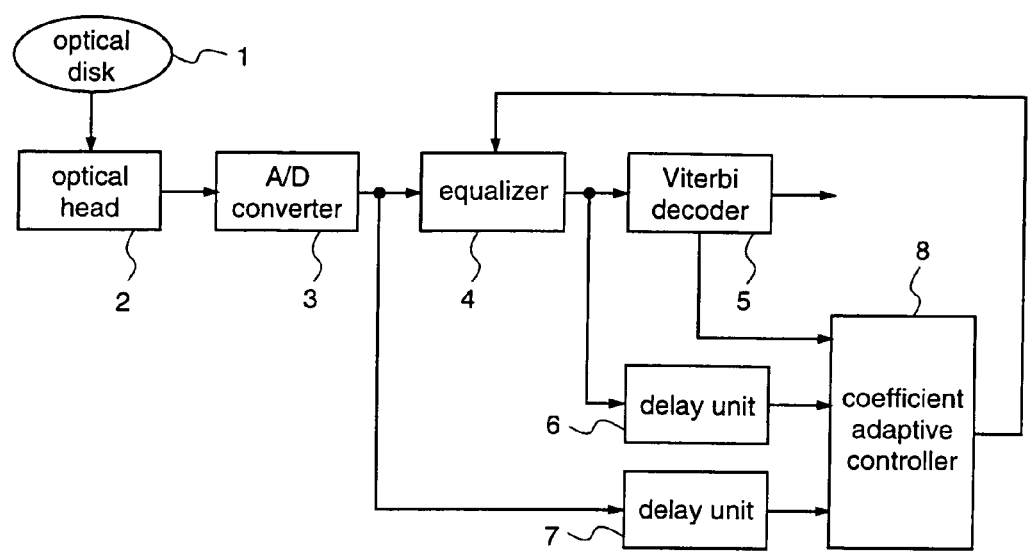
FIG. 10 is a block diagram illustrating the construction of a conventional adaptive equalization apparatus.
Figure 11:
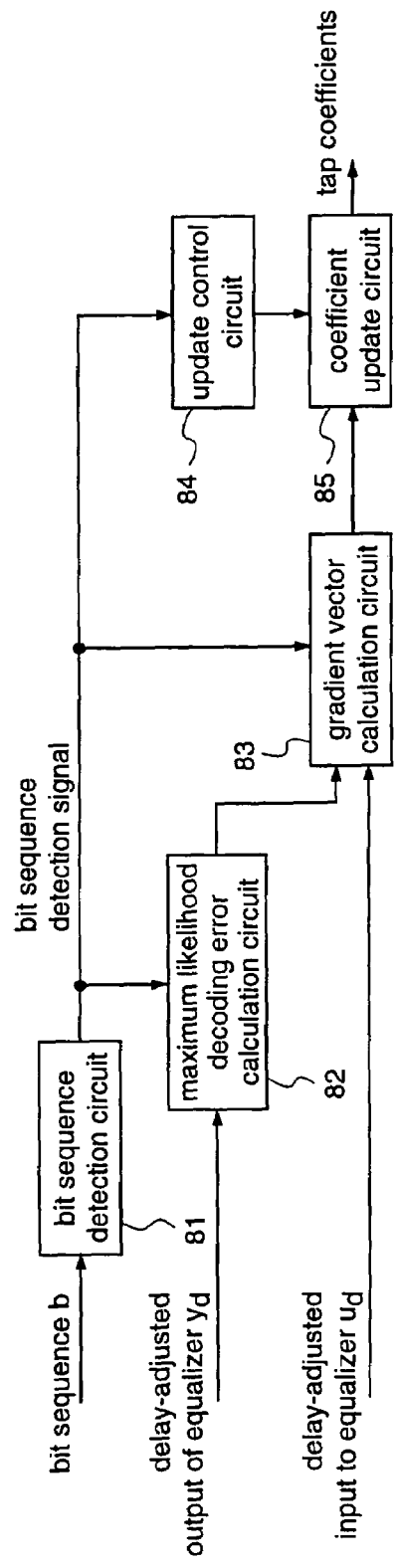
FIG. 11 is a block diagram illustrating the construction of a conventional coefficient adaptive controller.

FIG. 1 is a block diagram illustrating the construction of an adaptive equalization apparatus according to the first embodiment. In FIG. 1, the components of the adaptive equalization apparatus, which are identical or corresponding to those shown in FIG. 10, are given the same reference numerals, and the explanations thereof are to be abbreviated.

A delay unit 111 delay-adjusts the output of the equalizer 4 to make the output coincide with the timing of the tentative decoded bit sequence in the process of maximum likelihood decoding. A delay unit 112 delay-adjusts the input to the equalizer 4 to make the input coincide with the timing of the above-described tentative decoded bit sequence.

When only one survival path is left in the trellis diagram, the Viterbi decoder 5 has to decode the bits corresponding to the survival path, and therefore, it is provided with a path memory having a length that is sufficient to hold the path which is expected to be the last survival path. For example, assuming that the length of the path memory is equivalent to 30 stages, it is practically very rare that the survival path finally becomes one in the 30th stage. This situation could occur only when considerably great noise is superposed on the input signal to the Viterbi decoder 5. Of course, redundancy is indispensable in order to use the result of maximum likelihood decoding, and there is a significant meaning in the length of 30 stages. Nevertheless, when adaptive equalization is carried out successively, there is practically no problem even if a bit sequence is tentatively decoded from, for instance, the 10th stage of the path memory. Accordingly, in this first embodiment, a description will be given of the case where a tentative decoded bit sequence in the process of maximum likelihood decoding is obtained from the 10th stage of the path memory.

Further, a coefficient adaptive controller 8 adaptively controls the tap coefficients so that the output of the equalizer 4 becomes PR(a,b,b,a) equalization, PR(a,b,a) equalization, or PR(a,b,c,b,a) equalization. As concrete PR classes, there are (1,2,2,1), (3,4,4,3), (1,2,1), (1,2,2,2,1), and the like. In this first embodiment, it is assumed that the tap coefficients are adaptively controlled so that PR(1,2,2,1) equalization is realized.

Hereinafter, the operation of the adaptive equalization apparatus according to the first embodiment will be described.

A bit sequence, which is recorded on the optical disk 1, is read by the optical head 2 as an analog playback signal, and converted into a digital playback signal by the A/D converter 3, and then equalized into a PR(1,2,2,1) signal by the equalizer 4. The equalized digital signal is subjected to maximum likelihood decoding by the Viterbi decoder 5, whereby a maximum likelihood decoded bit sequence is obtained.

On the other hand, the delay units 111 and 112 delay-adjust the output of the equalizer 4 and the input to the equalizer 4, respectively, so as to make the output and the input coincide with the timing of a tentative decoded bit sequence in the process of the maximum likelihood decoding, for example, a tentative decoded bit sequence which is obtained from the 10th stage of the path memory, and output them to the coefficient adaptive controller 8.

Then, the coefficient adaptive controller 8 adaptively updates the tap coefficients on the basis of the tentative decoded bit sequence, the delay-adjusted output of the equalizer 4, and the delay-adjusted input to the equalizer 4.

As described above, according to the first embodiment, a tentative decoded bit sequence, which is obtained from some midpoint in the path memory of the Viterbi decoder 5, for example, from the 10th stage of the path memory, is input to the coefficient adaptive controller 8, and the tap coefficients are adaptively controlled on the basis of the tentative decoded bit sequence, the output of the equalizer 4 which is delay-adjusted by the delay unit 111, and the input to the equalizer 4 which is delay-adjusted by the delay unit 112. Therefore, the number of stages in the delay units 111 and 112 can be reduced by, in this example, 20 stages as compared to the conventional method, whereby the loop delay required for the adaptive equalization is shortened by 20 stages. As a result, the coefficient convergence characteristics are improved. Further, the circuit scale can be reduced by the number of the reduced delay stages.

Embodiment 2

Hereinafter, an adaptive equalization apparatus according to a second embodiment will be described with reference to FIG. 2.

Figure 2:
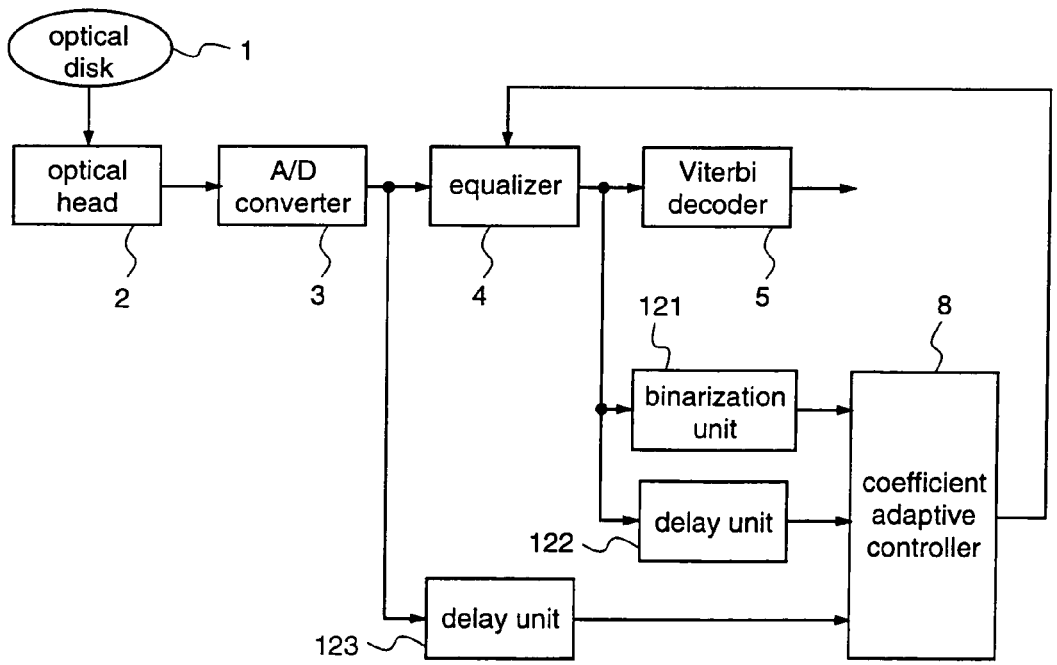
FIG. 2 is a block diagram illustrating the construction of an adaptive equalization apparatus according to a second embodiment of the present invention.

FIG. 2 is a block diagram illustrating the construction of an adaptive equalization apparatus according to the second embodiment. In FIG. 2, the components of the adaptive equalization apparatus, which are identical or corresponding to those shown in FIG. 10, are given the same reference numerals, and the explanations thereof are to be abbreviated.

A binarization unit 121 binarizes the output of the equalizer 4. A delay unit 122 delay-adjusts the output of the equalizer 4 so as to make the output coincide with the timing of the output signal of the binarization unit 121. A delay unit 123 delay-adjusts the input to the equalizer 4 so as to make the input coincide with the timing of the output signal of the binarization unit 121.

Although it is considered that the bit sequence obtained from maximum likelihood decoding is closest to the recorded bit sequence, bit sequences close to the recorded bit sequence can also be obtained by other methods. For example, a bit sequence close to the recorded bit sequence can be obtained by binarizing the output of the equalizer 4 with level judgement. Of course, there is a probability that the error rate might be increased because maximum likelihood decoding is not carried out, but the bit sequence so obtained is practically adequate for performing successive adaptive equalization. Accordingly, in this second embodiment, it is assumed that coefficient adaptive control is performed using the bit sequence that is obtained by binarizing the output of the equalizer 4.

Hereinafter, a description will be given of the operation of the adaptive equalization apparatus according to the second embodiment.

A bit sequence, which is recorded on the optical disk 1, is read by the optical head 2 as an analog playback signal, and converted into a digital playback signal by the A/D converter 3, and then equalized into a PR(1,2,2,1) signal by the equalizer 4. The equalized digital signal is subjected to maximum likelihood decoding by the Viterbi decoder 5, whereby a maximum likelihood decoded bit sequence is obtained.

On the other hand, the binarization unit 121 binarizes the output of the equalizer 4, and outputs the binarized bit sequence to the coefficient adaptive controller 8. The delay units 122 and 123 carry out delay adjustment of the output of the equalizer 4 and the input to the equalizer 4, respectively, so as to make the output and the input coincide with the timing of the bit sequence that is output from the binarization unit 121, and output them to the coefficient adaptive controller 8.

Then, the coefficient adaptive controller 8 adaptively updates the tap coefficients on the basis of the bit sequence outputted from the binarization unit 121, the delay-adjusted output of the equalizer 4, and the delay-adjusted input to the equalizer 4.

As described above, according to the second embodiment, a bit sequence, which is obtained by binarizing the output of the equalizer 4 with the binarization unit 121, is input to the coefficient adaptive controller 8, and the tap coefficients are adaptively controlled on the basis of this bit sequence, the output of the equalizer 4 which is delay-adjusted by the delay unit 122, and the input to the equalizer 4 which is delay-adjusted by the delay unit 123. Therefore, it becomes unnecessary to wait for the delay in the Viterbi decoder 5, and the number of delay stages in the delay units 122 and 123 can be reduced as compared with those in the delay units 111 and 112 shown in FIG. 1, whereby the loop required for adaptive equalization can be made shorter. As a result, the coefficient convergence characteristics are improved, and further, the circuit scale can be reduced by the reduced delay stages.

Embodiment 3

Hereinafter, an adaptive equalization apparatus according to a third embodiment will be described with reference to FIG. 3.

Figure 3:
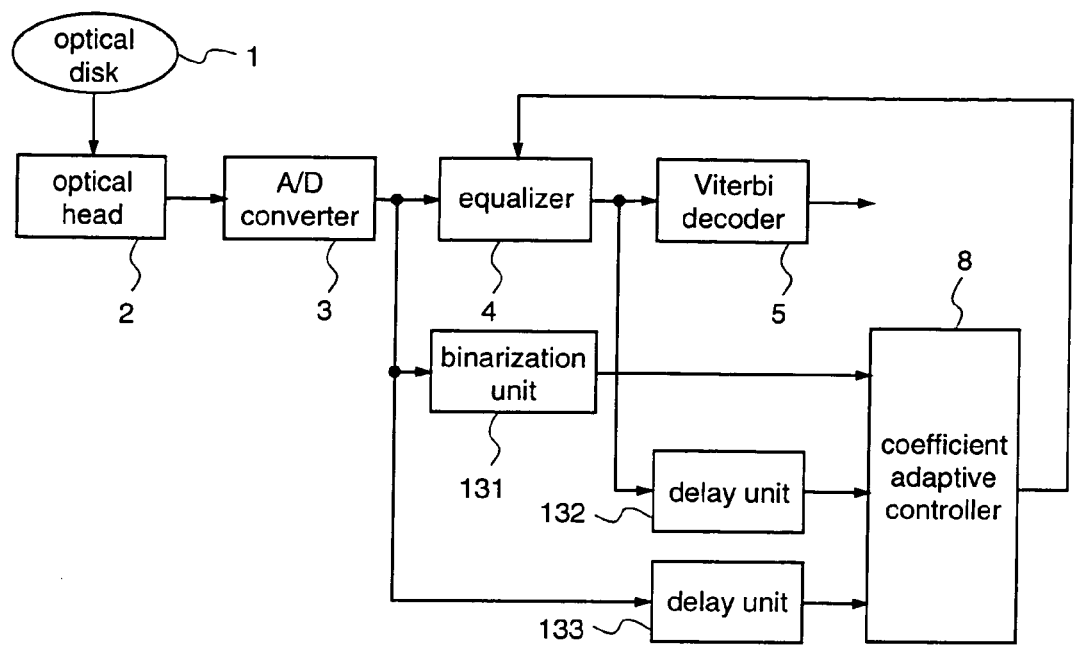
FIG. 3 is a block diagram illustrating the construction of an adaptive equalization apparatus according to a third embodiment of the present invention.

FIG. 3 is a diagram illustrating the construction of an adaptive equalization apparatus according to the third embodiment. In FIG. 3, the components of the adaptive equalization apparatus, which are identical or corresponding to those shown in FIG. 10, are given the same reference numerals, and the explanations thereof are to be abbreviated.

A binarization unit 131 binarizes the output of the equalizer 4. A delay unit 132 delay-adjusts the output of the equalizer 4 so as to make the output coincide with the timing of the output signal of the binarization unit 131. A delay unit 133 delay-adjusts the input to the equalizer 4 so as to make the input coincide with the timing of the output signal of the binarization unit 131.

Although it is considered that the bit sequence obtained from maximum likelihood decoding is closest to the recorded bit sequence, bit sequences close to the recorded bit sequence can also be obtained by other methods. For example, a bit sequence close to the recorded bit sequence can be obtained by binarizing the output of the equalizer 4 with level judgement. Of course, there is a probability that the error rate might be increased because maximum likelihood decoding is not carried out, but the bit sequence so obtained is practically adequate for performing successive adaptive equalization. Accordingly, in this third embodiment, it is assumed that coefficient adaptive control is performed using the bit sequence that is obtained by binarizing the input to the equalizer 4.

Hereinafter, a description will be given of the operation of the adaptive equalization apparatus according to the third embodiment.

A bit sequence, which is recorded on the optical disk 1, is read by the optical head 2 as an analog playback signal, and converted into a digital playback signal by the A/D converter 3, and then equalized into a PR(1,2,2,1) signal by the equalizer 4. The equalized digital signal is subjected to maximum likelihood decoding by the Viterbi decoder 5, whereby a maximum likelihood decoded bit sequence is obtained.

On the other hand, the binarization unit 131 binarizes the input to the equalizer 4, and outputs the binarized bit sequence to the coefficient adaptive controller 8. The delay units 132 and 133 carry out delay adjustment of the output of the equalizer 4 and the input to the equalizer 4, respectively, so as to make the output and the input coincide with the timing of the bit sequence that is output from the binarization unit 131, and output them to the coefficient adaptive controller 8.

Then, the coefficient adaptive controller 8 adaptively updates the tap coefficients on the basis of the bit sequence outputted from the binarization unit 131, the delay-adjusted output of the equalizer 4, and the delay-adjusted input to the equalizer 4.

As described above, according to the third embodiment, a bit sequence, which is obtained by binarizing the input to the equalizer 4 with the binarization unit 131, is input to the coefficient adapting controller 8, and the tap coefficients are adaptively controlled on the basis of this bit sequence, the output of the equalizer 4 which is delay-adjusted by the delay unit 132, and the input to the equalizer 4 which is delay-adjusted by the delay unit 133. Therefore, it becomes unnecessary to wait for the delay in the equalizer 4, and the number of delay stages in the delay units 132 and 133 can be reduced as compared with those in the delay units 122 and 123 shown in FIG. 2, and thereby the loop required for adaptive equalization can be shortened. As a result, the tap coefficient convergence characteristics can be improved, and further, the circuit scale can be reduced by the reduced delay stages.

Embodiment 4

Hereinafter, an adaptive equalization apparatus according to a fourth embodiment will be described with reference to FIG. 4.

Figure 4:
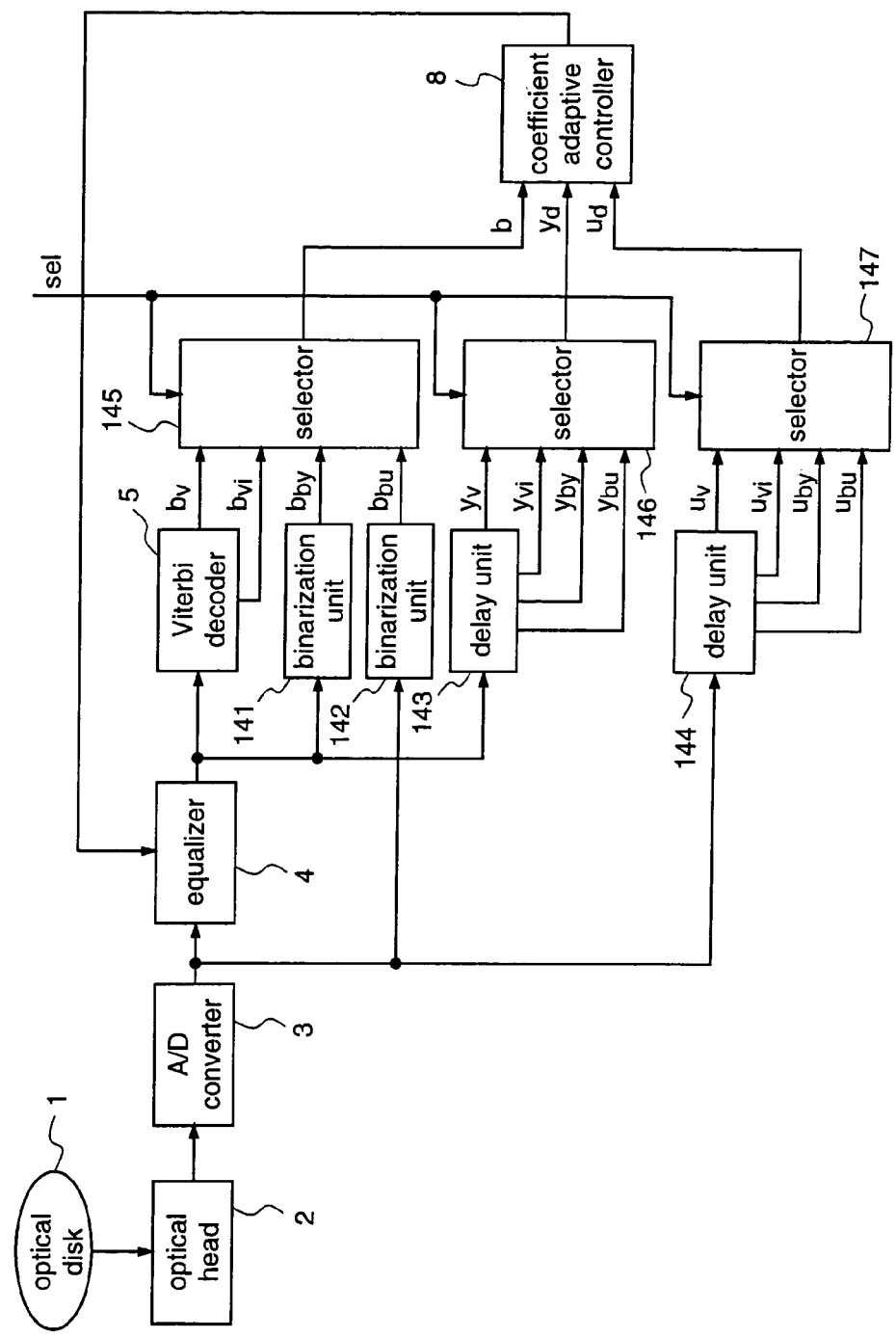
FIG. 4 is a block diagram illustrating the construction of an adaptive equalization apparatus according to a fourth embodiment of the present invention.

FIG. 4 is a diagram illustrating the construction of an adaptive equalization apparatus according to the fourth embodiment. In FIG. 4, the components of the adaptive equalization apparatus, which are identical or corresponding to those shown in FIG. 10, are given the same reference numerals, and the explanations thereof are to be abbreviated.

A binarization unit 141 binarizes the output of the equalizer 4. A binarization unit 142 binarizes the input to the equalizer 4.

A delay unit 143 delay-adjusts the output of the equalizer 4 so as to make the output coincide with the timing of the decoded bit sequence $b_v$, the timing of the tentative decoded bit sequence $b_{vi}$, the timing of the output of the binarization unit 141 $b_{by}$, and the timing of the output of the binarization unit 142 $b_{bu}$, respectively, and outputs four types of delay-adjusted outputs of the equalizer 4, $y_v$, $y_{vi}$, $y_{by}$, $t_{bu}$. A delay unit 144 delay-adjusts the input to the equalizer 4 so as to make the input coincide with the timing of the decoded bit sequence $b_v$, the timing of the tentative decoded bit sequence $b_{vi}$, the timing of the output of the binarization unit 141 $b_{by}$, and the timing of the output of the binarization unit 142 $b_{bu}$, respectively, and outputs four types of delay-adjusted inputs to the equalizer 4, $u_v$, $u_{vi}$, $u_{by}$, $u_{bu}$.

A selector 145 selects, according to a selection signal sel supplied from the outside, one sequence out of the decoded bit sequence $b_v$, the tentative decoded bit sequence $b_{vi}$, the output of the binarization unit 141 $b_{by}$, and the output of the binarization unit 142 $b_{bu}$. A selector 146 selects, according to the selection signal sel supplied from the outside, one out of $y_v$, $y_{vi}$, $y_{by}$, $y_{bu}$, which are outputted from the delay unit 143. A selector 147 selects, according to the selection signal sel supplied from the outside, one out of $u_v$, $u_{vi}$, $u_{by}$, $u_{bu}$, which are outputted from the delay unit 144.

Hereinafter, a description will be given of the operation of the adaptive equalization apparatus according to the fourth embodiment.

A bit sequence, which is recorded on the optical disk 1, is read by the optical head 2 as an analog playback signal, and converted into a digital playback signal by the A/D converter 3, and then equalized into a PR(1,2,2,1) signal by the equalizer 4. The equalized digital signal is subjected to maximum likelihood decoding by the Viterbi decoder 5, whereby a maximum likelihood decoded bit sequence is obtained.

On the other hand, the selector 145 selects, according to the selection signal sel supplied from the outside, one sequence out of the maximum likelihood decoded bit sequence $b_v$ which is obtained from the Viterbi decoder 5, the tentative decoded bit sequence $b_{vi}$ which is obtained during the process of maximum likelihood decoding, the bit sequence $b_{by}$ which is obtained by binarizing the output of the equalizer 4, and the bit sequence $b_{bu}$ which is obtained by binarizing the input to the equalizer 4, and outputs the selected sequence to the coefficient adaptive controller 8.

The selector 146 selects, according to the selection signal sel, one out of the four types of outputs of the equalizer 4, $y_v$, $y_{vi}$, $y_{by}$, $y_{bu}$, which are delay-adjusted to coincide with the timings of the above-described four types of bit sequences, respectively, and outputs the selected one to the coefficient adaptive controller 8.

The selector 147 selects, according to the selection signal sel, one out of the four types of inputs to the equalizer 4, $u_v$, $u_{vi}$, $u_{by}$, $u_{bu}$, which are delay-adjusted to coincide with the timings of the above-described four types of bit sequences, respectively, and outputs the selected one to the coefficient adaptive controller 8.

The coefficient adaptive controller 8 adaptively updates the tap coefficients on the basis of the bit sequence b selected by the selector 145, the delay-adjusted output of the equalizer 4 $y_d$ which is selected by the selector 146, and the delay-adjusted input to the equalizer 4 $u_d$ which is selected by the selector 147.

Hereinafter, a description will be given of the selection signal sel, which is supplied from the outside of the adaptive equalization apparatus. Although there are a variety of methods to determine the selection signal sel, hereby a determination method depending on the elapsed time will be given as an example.

In the initial state, the channel characteristics from a recording medium such as the optical disk 1 to the equalizer 4 are unknown, and therefore, initialization should be made so that only the center of the tap coefficients of the equalizer 4 is 1 while the remaining tap coefficients are 0. This implies that the output of the equalizer 4 is merely a delayed input to the equalizer 4, and waveform equalization will not be carried out. Therefore, there is a high probability that the bit sequence $b_{by}$ contains errors, and the tap coefficients might be controlled in a wrong direction if the bit sequence $b_{by}$ is selected for coefficient adaptive control. Likewise, it is also highly possible for the bit sequence $b_{vi}$ to contain errors. Therefore, the selection signal sel is determined such that the bit sequence $b_v$, which is considered to have least errors, is selected to be used for coefficient adaptive control. In addition, the number of delay stages for the output of the equalizer 4 and the input to the equalizer 4 should also be changed according to the selected bit sequence.

In this state, however, the loop delay is so long that it takes a long time for the tap coefficients to converge to optimal values.

Therefore, the selection signal sel is determined such that the bit sequence $b_{vi}$ will be selected after a predetermined period of time has passed. Even when the selection signal sel is thus determined, the tap coefficients can be controlled in a correct direction, since the characteristics of the equalizer 4 are improved and the reliability of the bit sequence $b_{vi}$ is increased by performing coefficient adaptive control for a predetermined period of time. Further, the selection signal sel is determined such that the bit sequence $b_{by}$ will be selected after another predetermined period of time has passed, and finally, the selection signal sel is determined such that the bit sequence $b_{bu}$ will be selected.

As described above, by changing the selection signal sel such that the bit sequence to be selected varies with time in the order of $b_v$, $b_{vi}$, $b_{by}$, $b_{bu}$, it is possible to shorten the period of time during which the tap coefficients converge to optimal values. Simultaneously, it is also possible to follow the abrupt variations in channel characteristics.

In the fourth embodiment described above, according to the selection signal sel supplied from the outside, one bit sequence is selected out of the maximum likelihood decoded bit sequence $b_v$, the tentative decoded bit sequence $b_{vi}$ obtained during the process of maximum likelihood decoding, the bit sequence $b_{by}$ obtained by binarizing the output of the equalizer 4, and the bit sequence $b_{bu}$ obtained by binarizing the input to the equalizer 4, and the selected bit sequence is input to the coefficient adaptive controller 8, and then the tap coefficients are adaptively controlled on the basis of the selected bit sequence b, and the output $y_d$ of the equalizer 4 as well as the input $u_d$ to the equalizer 4, which are delay-adjusted so as to coincide with the timing of the selected bit sequence. Therefore, it is possible to carry out adaptive equalization in accordance with the quality of the playback signals, resulting in improved coefficient convergence characteristics.

Embodiment 5

Hereinafter, an adaptive equalization apparatus according to a fifth embodiment of the present invention will be described with reference to FIG. 5.

Figure 5:
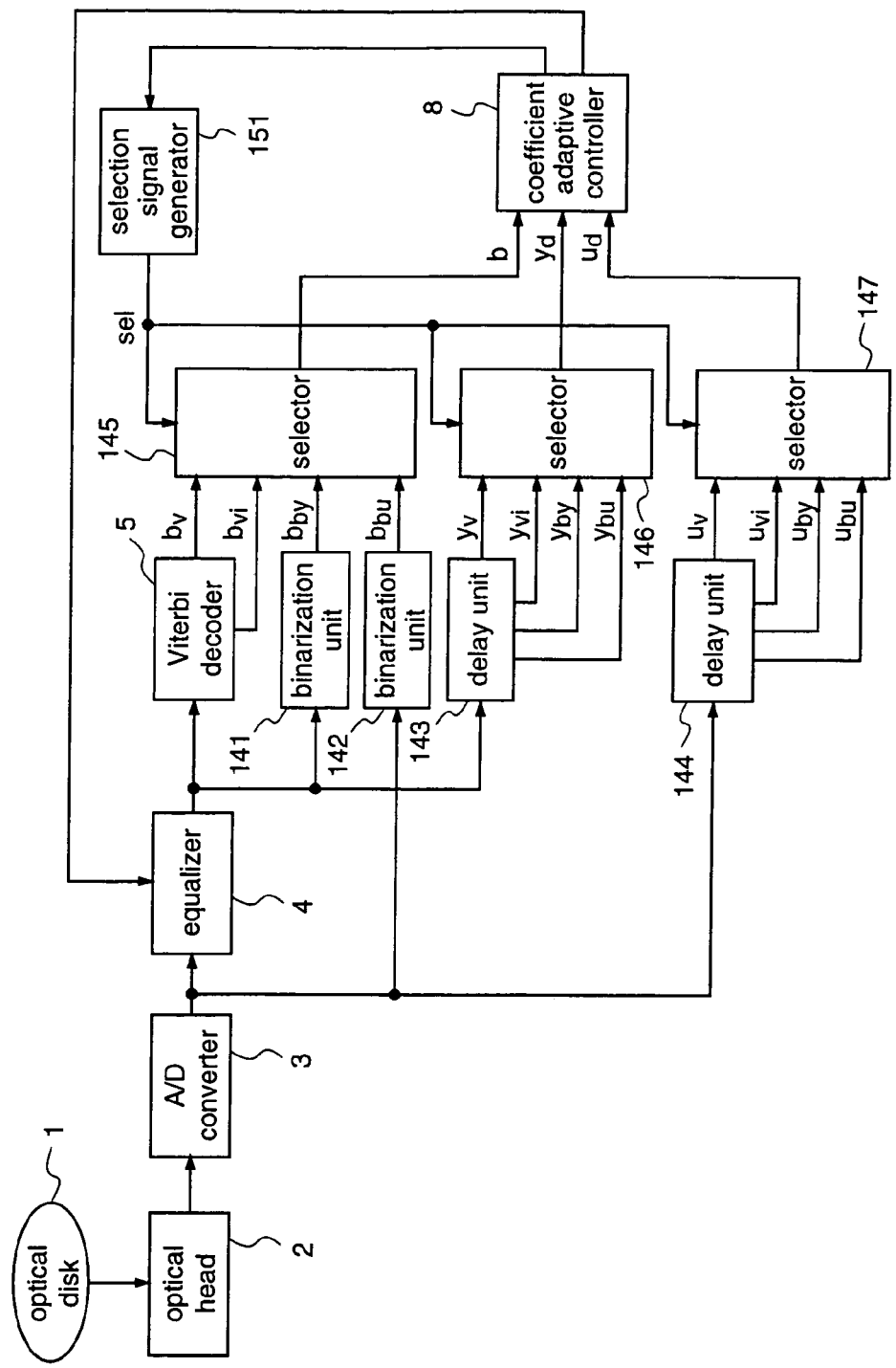
FIG. 5 is a block diagram illustrating the construction of an adaptive equalization apparatus according to a fifth embodiment of the present invention.

FIG. 5 is a diagram illustrating the construction of an adaptive equalization apparatus according to the fifth embodiment. In FIG. 5, the components of the adaptive equalization apparatus, which are identical or corresponding to those shown in FIG. 4, are given the same reference numerals, and the explanations thereof are to be abbreviated.

A selection signal generator 151 generates a selection signal sel on the basis of an error in maximum likelihood decoding, which is obtained from the output of the equalizer 4. It is considered that, when the maximum likelihood decoding error is small, even a bit sequence obtained by binarizing the input to the equalizer 4 has few errors. It is also considered that, when the maximum likelihood decoding error is large, errors cannot be removed from the decoded bit sequence unless the bit sequence is obtained by the Viterbi decoder 5. Therefore, the selection signal generator 151 receives the maximum likelihood decoding error from the coefficient adaptive controller 8, and determines which bit sequence to be selected according to the value of the maximum likelihood decoding error.

Hereinafter, a description will be given of the operation of the adaptive equalization apparatus according to the fifth embodiment.

A bit sequence, which is recorded on the optical disk 1, is read by the optical head 2 as an analog playback signal, and converted into a digital playback signal by the A/D converter 3, and then equalized into a PR(1,2,2,1) signal by the equalizer 4. The equalized digital signal is subjected to maximum likelihood decoding by the Viterbi decoder 5, whereby a maximum likelihood decoded bit sequence is obtained.

On the other hand, the selection signal generator 151 receives the maximum likelihood decoding error from the coefficient adaptive controller 8, and generates a selection signal sel on the basis of the maximum likelihood decoding error. Then, the selector 145 selects, according to the selection signal sel, one out of the maximum likelihood decoded bit sequence $b_v$ obtained from the Viterbi decoder 5, the tentative decoded bit sequence $b_{vi}$ obtained in the process of maximum likelihood decoding, the bit sequence $b_{by}$ obtained by binarizing the output of the equalizer 4, and the bit sequence $b_{bu}$ obtained by binarizing the input to the equalizer 4, and outputs the selected one to the coefficient adaptive controller 8.

The selector 146 selects, according to the selection signal sel, one out of the four types of outputs of the equalizer 4, $y_v$, $y_{vi}$, $y_{by}$, $y_{bu}$, which are delay-adjusted to coincide with the timing of the above-described four types of bit sequences, respectively, and outputs the selected one to the coefficient adaptive controller 8.

The selector 147 selects, according to the selection signal sel, one out of the four types of inputs to the equalizer 4, $u_v$, $u_{vi}$, $u_{by}$, $u_{bu}$, which are delay-adjusted to coincide with the timing of the above-described four types of bit sequences, respectively, and outputs the selected one to the coefficient adaptive controller 8.

Then, the coefficient adaptive controller 8 adaptively updates the tap coefficients on the basis of the bit sequence b selected by the selector 145, the delay-adjusted output of the equalizer 4 $y_d$ which is selected by the selector 146, and the delay-adjusted input to the equalizer 4 $u_d$ which is selected by the selector 147.

In the adaptive equalization apparatus described above, according to the selection signal sel generated by the selection signal generator 151, one bit sequence is selected out of the maximum likelihood decoded bit sequence $b_v$, the tentative decoded bit sequence $b_{vi}$ obtained in the process of maximum likelihood decoding, the bit sequence $b_{by}$ obtained by binarizing the output of the equalizer 4, and the bit sequence $b_{bu}$ obtained by binarizing the input to the equalizer 4, and the selected bit sequence is input to the coefficient adaptive controller 8, and then the tap coefficients are adaptively controlled on the basis of the selected bit sequence b, and the output $y_d$ of the equalizer 4 as well as the input $u_d$ to the equalizer 4, which are delay-adjusted to coincide with the timing of the selected bit sequence. Therefore, it is possible to carry out adaptive equalization in accordance with the quality of the playback signal, resulting in improved coefficient convergence characteristics.

In addition, since the selection signal generator 151 is provided inside the adaptive equalization apparatus, it is possible to automatically carry out determination of the selection signal, resulting in improved user operability.

Figure 6:
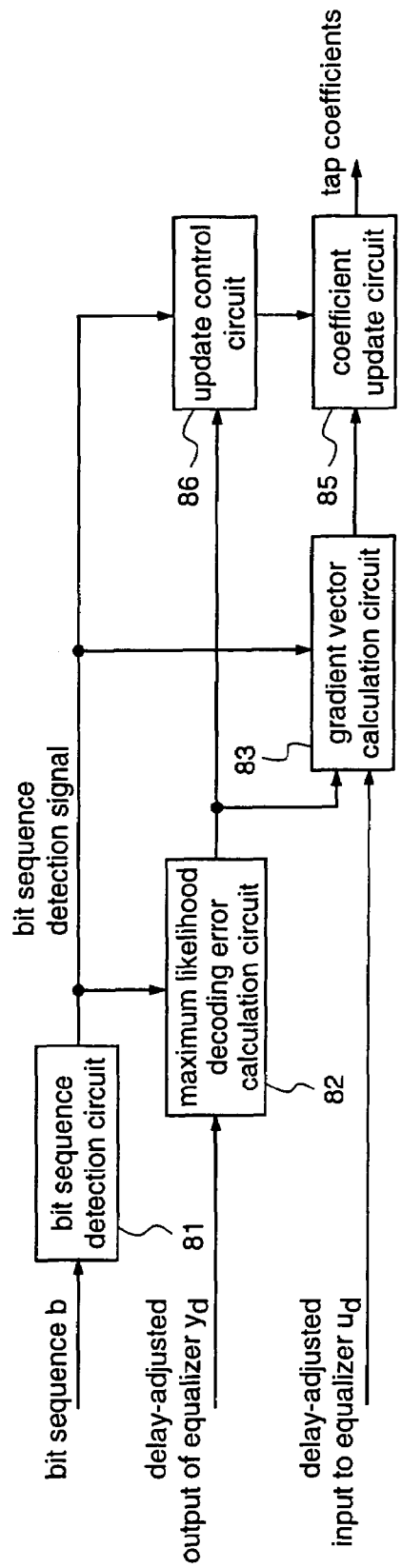
FIG. 6 is a block diagram illustrating the construction of a coefficient adaptive controller according to the present invention.
Figure 7:
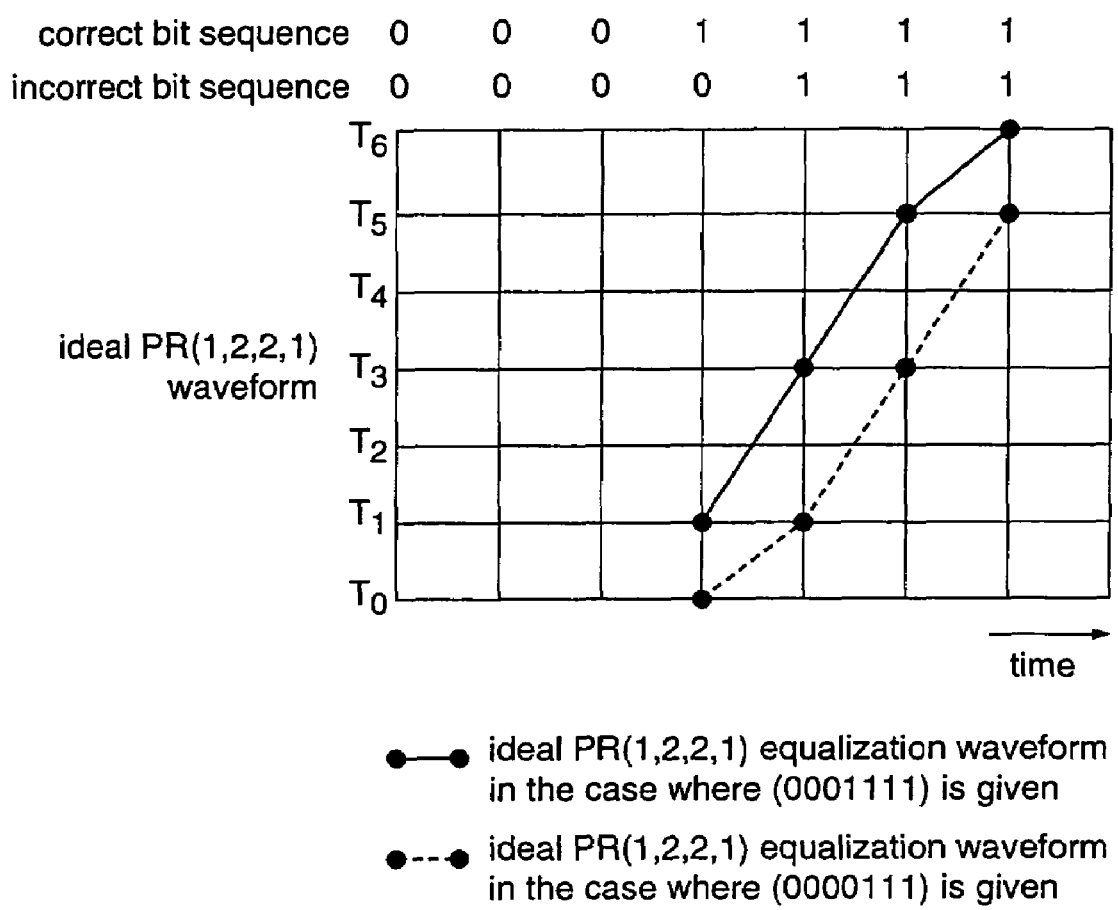
FIG. 7 is a diagram illustrating a waveform of an ideal PR(1,2,2,1) equalization.
Figure 8:
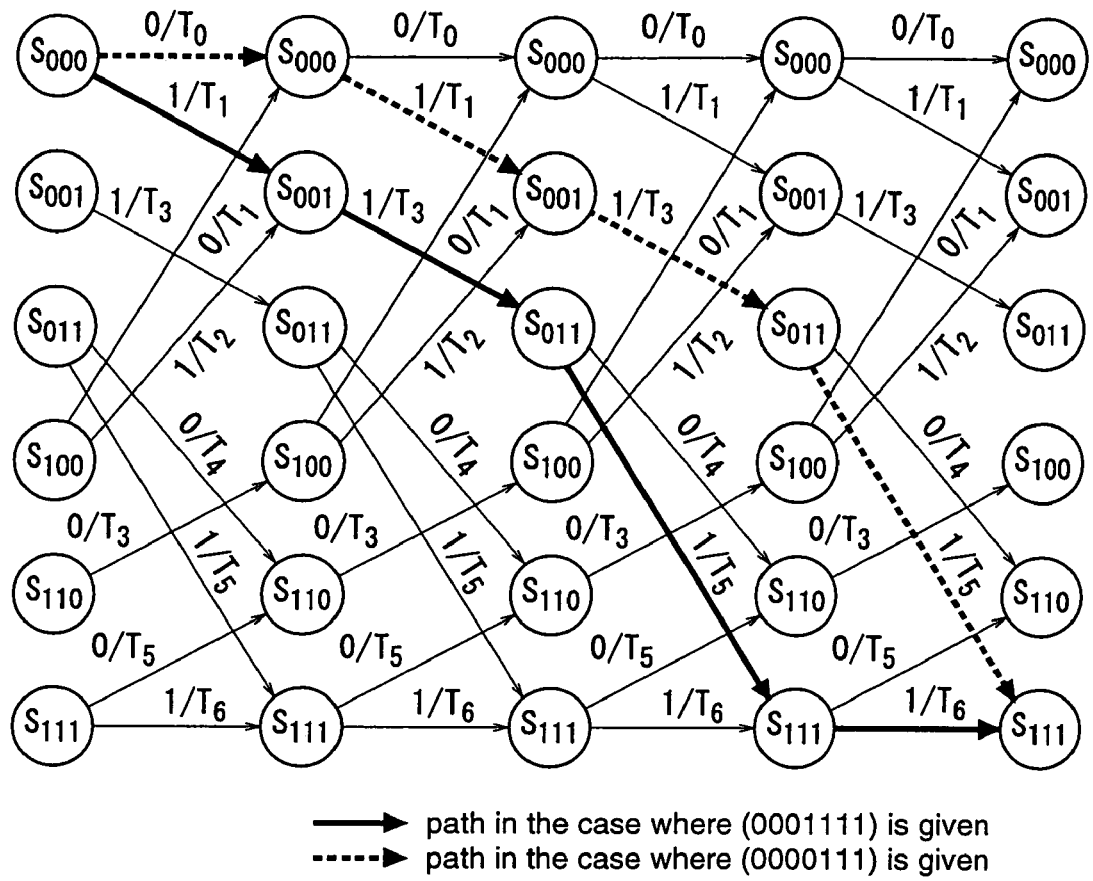
FIG. 8 is a trellis diagram which is given an ideal PR(1,2,2,1) equalization waveform.
Figure 9:
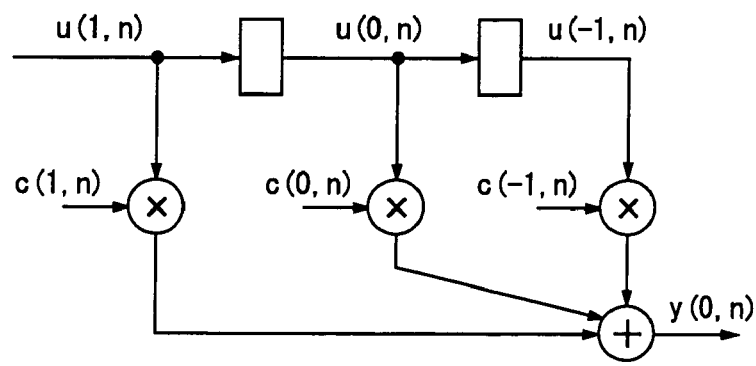
FIG. 9 is a diagram illustrating the construction of a FIR-type equalizer having 3 taps.

In the first to fifth embodiments described above, the conventional coefficient adaptive controller 8 is employed. However, as shown in FIG. 6, the update control circuit 86 may receive the bit sequence detection signal and the maximum likelihood decoding error, and instruct the coefficient update circuit 85 not to update the tap coefficients when the bit sequence detection signal is 0 (that is, when a specific bit sequence is not detected in the bit sequence detector 81) or when the maximum likelihood decoding error exceeds a specific value. Thereby, the tap coefficients are prevented from being updated in a wrong direction, because it is highly possible that the bit sequence itself is incorrect when the maximum likelihood decoding error is too large.

An adaptive equalization apparatus according to the present invention, which is able to improve coefficient convergence characteristics by minimizing delay in a coefficient control loop, is applicable to an optical disk player, a magnetic disk player, a magneto-optical disk, and the like.

What is claimed is:

1. An adaptive equalization apparatus comprising:
an equalizer for equalizing a playback signal read from a recording medium, using tap coefficients;
a maximum likelihood decoder for subjecting an equalized signal outputted from the equalizer to maximum likelihood decoding;
a binarization unit for binarizing the equalized signal;
a first delay unit for delay-adjusting the playback signal to make the signal coincide with the timing of a binarized signal outputted from the binarization unit;
a second delay unit for delay-adjusting the equalized signal to make the signal coincide with the timing of the binarized signal; and
a coefficient adaptive controller for adaptively controlling the tap coefficients so that an error in the maximum likelihood decoding is minimized, on the basis of the binarized signal, an output of the first delay unit, and an output of the second delay unit.

2. An adaptive equalization apparatus comprising:
an equalizer for equalizing a playback signal read from a recording medium, using tap coefficients;
a maximum likelihood decoder for subjecting an equalized signal outputted from the equalizer to maximum likelihood decoding;
a binarization unit for binarizing the playback signal;
a first delay unit for delay-adjusting the playback signal to make the signal coincide with the timing of a binarized signal outputted from the binarization unit;
a second delay unit for delay-adjusting the equalized signal to make the signal coincide with the timing of the binarized signal; and
a coefficient adaptive controller for adaptively controlling the tap coefficients so that an error in the maximum likelihood decoding is minimized, on the basis of the binarized signal, an output of the first delay unit, and an output of the second delay unit.

3. An adaptive equalization apparatus comprising:
an equalizer for equalizing a playback signal read from a recording medium, using tap coefficients;
a maximum likelihood decoder for subjecting an equalized signal outputted from the equalizer to maximum likelihood decoding;
a first binarization unit for binarizing the equalized signal;
a second binarization unit for binarizing the playback signal;
a selector for selecting one signal out of a maximum likelihood decoded signal that is a result of the maximum likelihood decoding, a tentative decoded signal obtained in the process of the maximum likelihood decoding, an output signal of the first binarization unit, and an output signal of the second binarization unit;
a first delay unit for delay-adjusting the playback signal to make the signal coincide with the timing of an output signal of the selector;
a second delay unit for delay-adjusting the equalized signal to make the signal coincide with the timing of the output signal of the selector; and
a coefficient adaptive controller for adaptively controlling the tap coefficients so that an error in the maximum likelihood decoding is minimized, on the basis of the output signal of the selector, an output signal of the first delay unit, and an output signal of the second delay unit.

4. An adaptive equalization apparatus as defined in claim 3, wherein said selector performs the selection on the basis of the error in the maximum likelihood decoding, which is calculated from the equalized signal by the coefficient adaptive controller.

5. An adaptive equalization method comprising:
an equalization step of equalizing a playback signal read from a recording medium, using tap coefficients;
a maximum likelihood decoding step of subjecting an equalized signal obtained in the equalization step to maximum likelihood decoding;
a binarization step of binarizing the equalized signal;
a first delay step of delay-adjusting the playback signal to make the signal coincide with the timing of a binarized signal that is obtained in the binarization step;
a second delay step of delay-adjusting the equalized signal to make the signal coincide with the timing of the binarized signal; and
a coefficient adaptive control step of adaptively controlling the tap coefficients so that an error in the maximum likelihood decoding is minimized, on the basis of the binarized signal, the delay-adjusted playback signal, and the delay-adjusted equalized signal.

6. An adaptive equalization method comprising:
an equalization step of equalizing a playback signal read from a recording medium, using tap coefficients;
a maximum likelihood decoding step of subjecting an equalized signal obtained in the equalization step to maximum likelihood decoding;
a binarization step of binarizing the playback signal;
a first delay step of delay-adjusting the playback signal to make the signal coincide with the timing of a binarized signal that is obtained in the binarization step;
a second delay step of delay-adjusting the equalized signal to make the signal coincide with the timing of the binarized signal; and
a coefficient adaptive control step of adaptively controlling the tap coefficients so that an error in the maximum likelihood decoding is minimized, on the basis of the binarized signal, the delay-adjusted playback signal, and the delay-adjusted equalized signal.

7. An adaptive equalization method comprising:
an equalization step of equalizing a playback signal read from a recording medium, using tap coefficients;
a maximum likelihood decoding step of subjecting an equalized signal obtained in the equalization step to maximum likelihood decoding;
a first binarization step of binarizing the equalized signal;
a second binarization step of binarizing the playback signal;
a selection step of selecting one signal out of a maximum likelihood decoded signal that is a result of the maximum likelihood decoding, a tentative decoded signal obtained in the process of the maximum likelihood decoding, the binarized equalized signal, and the binarized playback signal;
a first delay step of delay-adjusting the playback signal to make the signal coincide with the timing of a selection signal that is obtained in the selection step;
a second delay step of delay-adjusting the equalized signal to make the signal coincide with the timing of the selection signal; and
a coefficient adaptive control step of adaptively controlling the tap coefficients so that an error in the maximum likelihood decoding is minimized, on the basis of the selection signal, the delay-adjusted playback signal, and the delay-adjusted equalized signal.

8. An adaptive equalization method as defined in claim 7, wherein said selecting step performs the selection on the basis of the error in the maximum likelihood decoding, which is calculated from the equalized signal in the coefficient adaptive control step.

9. An adaptive equalization apparatus as defined in claim 1, wherein said coefficient adaptive controller does not perform updating of the tap coefficients when the error in the maximum likelihood decoding exceeds a predetermined value.

10. An adaptive equalization apparatus as defined in claim 2, wherein said coefficient adaptive controller does not perform updating of the tap coefficients when the error in the maximum likelihood decoding exceeds a predetermined value.

11. An adaptive equalization apparatus as defined in claim 3, wherein said coefficient adaptive controller does not perform updating of the tap coefficients when the error in the maximum likelihood decoding exceeds a predetermined value.

12. An adaptive equalization apparatus as defined in claim 1, wherein said coefficient adaptive controller adaptively controls the tap coefficients so that the equalized signal becomes a PR (a,b,b,a) equalized signal.

13. An adaptive equalization apparatus as defined in claim 2, wherein said coefficient adaptive controller adaptively controls the tap coefficients so that the equalized signal becomes a PR (a,b,b,a) equalized signal.

14. An adaptive equalization apparatus as defined in claim 3, wherein said coefficient adaptive controller adaptively controls the tap coefficients so that the equalized signal becomes a PR (a,b,b,a) equalized signal.

15. An adaptive equalization apparatus as defined in claim 1, wherein said coefficient adaptive controller adaptively controls the tap coefficients so that the equalized signal becomes a PR (1,2,2,1) equalized signal.

16. An adaptive equalization apparatus as defined in claim 2, wherein said coefficient adaptive controller adaptively controls the tap coefficients so that the equalized signal becomes a PR (1,2,2,1) equalized signal.

17. An adaptive equalization apparatus as defined in claim 3, wherein said coefficient adaptive controller adaptively controls the tap coefficients so that the equalized signal becomes a PR (1,2,2,1) equalized signal.

18. An adaptive equalization apparatus as defined in claim 1, wherein said coefficient adaptive controller adaptively controls the tap coefficients so that the equalized signal becomes a PR (3,4,4,3) equalized signal.

19. An adaptive equalization apparatus as defined in claim 2, wherein said coefficient adaptive controller adaptively controls the tap coefficients so that the equalized signal becomes a PR (3,4,4,3) equalized signal.

20. An adaptive equalization apparatus as defined in claim 3, wherein said coefficient adaptive controller adaptively controls the tap coefficients so that the equalized signal becomes a PR (3,4,4,3) equalized signal.

21. An adaptive equalization apparatus as defined in claim 1, wherein said coefficient adaptive controller adaptively controls the tap coefficients so that the equalized signal becomes a PR (a,b,a) equalized signal.

22. An adaptive equalization apparatus as defined in claim 2, wherein said coefficient adaptive controller adaptively controls the tap coefficients so that the equalized signal becomes a PR (a,b,a) equalized signal.

23. An adaptive equalization apparatus as defined in claim 2, wherein said coefficient adaptive controller adaptively controls the tap coefficients so that the equalized signal becomes a PR (a,b,a) equalized signal.

24. An adaptive equalization apparatus as defined in claim 1, wherein said coefficient adaptive controller adaptively controls the tap coefficients so that the equalized signal becomes a PR (1,2,1) equalized signal.

25. An adaptive equalization apparatus as defined in claim 2, wherein said coefficient adaptive controller adaptively controls the tap coefficients so that the equalized signal becomes a PR (1,2,1) equalized signal.

26. An adaptive equalization apparatus as defined in claim 3, wherein said coefficient adaptive controller adaptively controls the tap coefficients so that the equalized signal becomes a PR (1,2,1) equalized signal.

27. An adaptive equalization apparatus as defined in claim 1, wherein said coefficient adaptive controller adaptively controls the tap coefficients so that the equalized signal becomes a PR (a,b,c,b,a) equalized signal.

28. An adaptive equalization apparatus as defined in claim 2, wherein said coefficient adaptive controller adaptively controls the tap coefficients so that the equalized signal becomes a PR (a,b,c,b,a) equalized signal.

29. An adaptive equalization apparatus as defined in claim 3, wherein said coefficient adaptive controller adaptively controls the tap coefficients so that the equalized signal becomes a PR (a,b,c,b,a) equalized signal.

30. An adaptive equalization apparatus as defined in claim 1, wherein said coefficient adaptive controller adaptively controls the tap coefficients so that the equalized signal becomes a PR (1,2,2,2,1) equalized signal.

31. An adaptive equalization apparatus as defined in claim 2, wherein said coefficient adaptive controller adaptively controls the tap coefficients so that the equalized signal becomes a PR (1,2,2,2,1) equalized signal.

32. An adaptive equalization apparatus as defined in claim 3, wherein said coefficient adaptive controller adaptively controls the tap coefficients so that the equalized signal becomes a PR (1,2,2,2,1) equalized signal.

33. An adaptive equalization apparatus as defined in claim 1, wherein said adaptive equalization apparatus is employed in an optical disk playback apparatus.

34. An adaptive equalization apparatus as defined in claim 2, wherein said adaptive equalization apparatus is employed in an optical disk playback apparatus.

35. An adaptive equalization apparatus as defined in claim 3, wherein said adaptive equalization apparatus is employed in an optical disk playback apparatus.

36. An adaptive equalization apparatus as defined in claim 1, wherein said adaptive equalization apparatus is employed in a magnetic disk playback apparatus.

37. An adaptive equalization apparatus as defined in claim 2, wherein said adaptive equalization apparatus is employed in a magnetic disk playback apparatus.

38. An adaptive equalization apparatus as defined in claim 3, wherein said adaptive equalization apparatus is employed in a magnetic disk playback apparatus.

39. An adaptive equalization apparatus as defined in claim 1, wherein said adaptive equalization apparatus is employed in a magneto-optical disk playback apparatus.

40. An adaptive equalization apparatus as defined in claim 2, wherein said adaptive equalization apparatus is employed in a magneto-optical disk playback apparatus.

41. An adaptive equalization apparatus as defined in claim 3, wherein said adaptive equalization apparatus is employed in a magneto-optical disk playback apparatus.

42. An adaptive equalization method as defined in claim 7, wherein said coefficient adaptive control step does not perform updating of the tap coefficients when the error in the maximum likelihood decoding exceeds a predetermined value.

* * * * *